November 17, 1942

UNITED STATES PATENT OFFICE 2,302,070

WETTING AGENT

Alexander J. Stirton, Robert F. Peterson, and Philip H. Groggins, Washington, D. C., assignors to Henry A. Wallace, as Secretary of Agriculture of the United States of America, and his successors in office No Drawing. Application October 10, 1939, Serial No. 298,792

11 Claims. (Cl. 252—354)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to new compositions of matter having valuable properties as wetting agents, textile assistants, penetrants, surface-active agents, and the like, and is more particularly concerned with new compositions of matter chemically classed as sulfoarylstearic acids and esters, defined by the formulae:

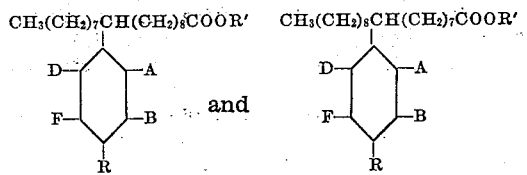

where A, B, D, F may be a hydrogen atom, an alkyl group, such as methyl, ethyl, isopropyl, etc., or the group —$SO_3H$; and R may be the group —$SO_3H$ or a para-orienting radical, such as phenoxy, phenyl, methyl, chloro, bromo, methoxy, ethoxy or a substituted phenyl or phenoxy radical in which one or more hydrogen atoms have been replaced by —$SO_3H$. A, B, D, F and R are such that at least one symbol represents or contains the group —$SO_3H$. R' may be H or an alkyl group.

As specific examples of the new compositions of matter the following formulae and names are cited as an illustration, rather than a limitation of this invention:

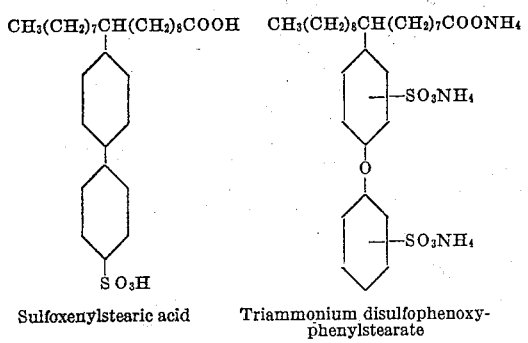

Sulfoxenylstearic acid    Triammonium disulfophenoxyphenylstearate

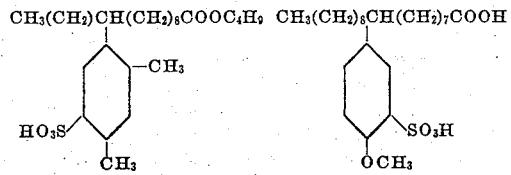

Butyl sulfoxylylstearate    Sulfomethoxyphenylstearic acid

The new compositions of matter embraced herein may be prepared by the following reactions: (1) a Friedel and Crafts reaction between oleic acid, an aromatic compound, and aluminum chloride; (2) the sulfonation of the arylstearic acid isolated in step (1). An alkyl ester of a sulfoarylstearic acid may be prepared by using an oleate ester rather than oleic acid in the Friedel and Crafts reaction.

The reaction between oleic acid, an aromatic compound and aluminum chloride takes place as represented by the equation, in which R'' is a para-orienting substituent

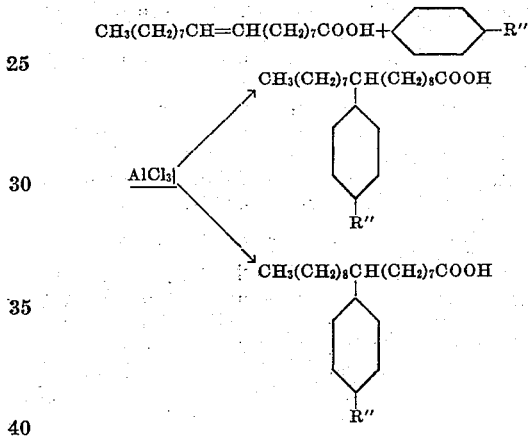

The product is a viscous oil, apparently not a single chemical individual, but a mixture of approximately equal parts of 9- and of 10-arylstearic acids.

The sulfonation of the arylstearic acid or ester may be accomplished with various sulfonating agents and within a range of temperature and time, the choice of reaction conditions depending somewhat on the arylstearic compound to be sulfonated and the degree of sulfonation desired. We have found that many of the arylstearic compounds are most effectively mono-sulfonated by using an 8:1 molar ratio of 95% sulfuric acid, adding the arylstearic compound to the acid gradually, and running the reaction for about 1 hour at 40-100° C. The reaction product is isolated by pouring the sulfonated mass into water and separating therefrom the material soluble in ether and extractable from its ether solution by means of water. Disulfonated products if present remain in the water solution along with excess of sulfuric acid and may be recovered by known methods.

The following are specific examples of the preparation of the arylstearic compounds of our invention, but are not to be construed as limiting the scope of the invention:

Example 1.—Sulfoxylylstearic acid 1.1 mols of oleic acid, 6.6 mols of xylene and 1.18 mols of anhydrous aluminum chloride are reacted for 4 hours at 80° C. The mass is hydrolyzed in dilute hydrochloric acid, the solvent layer is separated and washed, and the excess of xylene is recovered by steam distillation. Steam distillation is continued, using superheated steam, to remove solid saturated fatty acids and to obtain a dry product. Yield 74%.

The crude xylylstearic acid is sulfonated with 2.2 parts by weight of concentrated sulfuric acid for 1 hour at 100° C. The reaction mass is poured into water and the system extracted with ether. The ether solution is extracted with water, the aqueous solution neutralized with sodium hydroxide and evaporated. The dry residue is extracted with hot alcohol, the alcohol distilled from the alcoholic extract and sulfoxylylstearic acid isolated as the sodium salt. Analysis for sulfur=5.79%, calculated for $$C_{26}H_{42}O_5SNa_2=6.26\%.$$

Example 2.—Sulfocymylstearic acid 200 grams of cymylstearic acid, B. P. 211–235° C. at .2 mm. is obtained by fractional distillation under reduced pressure of the crude product obtained by a Friedel and Crafts reaction between p-cymene, oleic acid and aluminum chloride. The cymylstearic acid is sulfonated with 216 cc. 95% sulfuric acid, for 1 hour at 100° C. The reaction mass is poured into water, then extracted with ether. The ether solution is extracted with water, the water extract neutralized, evaporated, extracted with alcohol, and the alcohol distilled off. The product is the disodium salt of sulfocymylstearic acid. Analysis for sulfur=6.06%, calculated for $C_{28}H_{46}O_5SNa_2=5.93\%$.

Example 3.—Sulfoxenylstearic acid 300 grams of xenylstearic acid (prepared from oleic acid and biphenyl (xenene) in the presence of aluminum chloride and o-dichlorobenzene) are added with stirring to 208 grams of 96% sulfuric acid. The mixture is heated at 95° C. for 1 hour. The sulfonated mass is poured into water and the system is extracted with ether. By an aqueous extraction of the ether solution, xenylstearic acid is isolated as the sodium salt. Analysis for sulfur=5.97%, calculated for $$C_{30}H_{42}O_5SNa_2=5.72\%.$$

Example 4.—Butyl sulfoxylylstearate 339 grams of n-butyl oleate (one mol) 743 grams (7 mols) of m-xylene and 143 grams (1.07 mols) of anhydrous aluminum chloride are reacted by the Friedel and Crafts reaction for 4 hours at 80° C. The cooled reaction mass is hydrolyzed, the solvent layer separated and washed, and excess of xylene recovered by distillation with steam. The dried residual oil is fractionated under reduced pressure. 318 grams of butyl xylstearate, B. P. 215–231° C. at .2 mm., saponification equivalent 445.7 (theoretical 444.4) is obtained in 72% yield.

300 grams of the ester is sulfonated with 300 cc. of concentrated sulfuric acid for 1 hour at 100° C. The sulfonated mass is poured into water and the system is extracted with ether. The ether solution is separated, extracted with water and the resulting water solution neutralized with sodium hydroxide and evaporated to dryness. The product contains the sodium salt of butyl sulfoxylylstearate.

Example 5.—Methyl sulfoxylylstearate 500 grams of methyl xylylstearate (prepared by the Friedel and Crafts reaction from methyl oleate, xylene and aluminum chloride) are dissolved in 2000 grams of carbon tetrachloride. 150 grams of chlorosulfonic acid are added slowly while stirring. The mixture is slowly warmed to the boiling point of carbon tetrachloride which is then distilled off. The reaction mass is neutralized with alcoholic sodium hydroxide and the alcohol distilled off. The product contains the sodium salt of methyl sulfoxylylstearate.

Example 6.—Methyl sulfoxylylstearate 500 grams of methyl xylylstearate are added with stirring to 560 cc. of 95% sulfuric acid. The reaction mass is slowly heated to 85° C. and that temperature is maintained for 1 hour. The mass is poured upon ice and extracted with ether. The ether solution is separated, extracted with water, the aqueous extract neutralized with sodium hydroxide and evaporated to dryness. The product contains the sodium salt of methyl sulfoxylylstearate. In the Draves-Clarkson wetting test (1938 Year Book, American Association of Textile Chemists and Colorists, page 183) a .2% solution at 25° C. will sink a 5 gram skein in 10 seconds.

The sulfonated products of our invention have been tested in the form of dilute solutions of the sodium salt by standard methods for evaluating wetting agents and have been found to have good penetrant action, to tolerate large concentrations of alkaline earth salts without precipitation, to greatly lower surface tension, and so forth.

Having thus described our invention, we claim:

1. A wetting agent comprising sulfotolylstearic acid.
2. A wetting agent comprising sulfoethylphenylstearic acid.
3. A wetting agent comprising sulfoxylylstearic acid.
4. A wetting agent comprising sulfomethoxyphenylstearic acid.
5. A wetting agent comprising sulfochlorophenylstearic acid.
6. A wetting agent comprising monosulfoxenylstearic acid.
7. A wetting agent comprising monosulfophenoxyphenylstearic acid.
8. A wetting agent comprising disulfophenoxyphenylstearic acid.
9. A wetting agent comprising methyl sulfoxylylstearate.
10. A wetting agent comprising ethyl sulfoxylylstearate.
11. A wetting agent comprising butyl sulfoxylylstearate.

ALEXANDER J. STIRTON.
ROBERT F. PETERSON.
PHILIP H. GROGGINS.